Patented Oct. 15, 1929

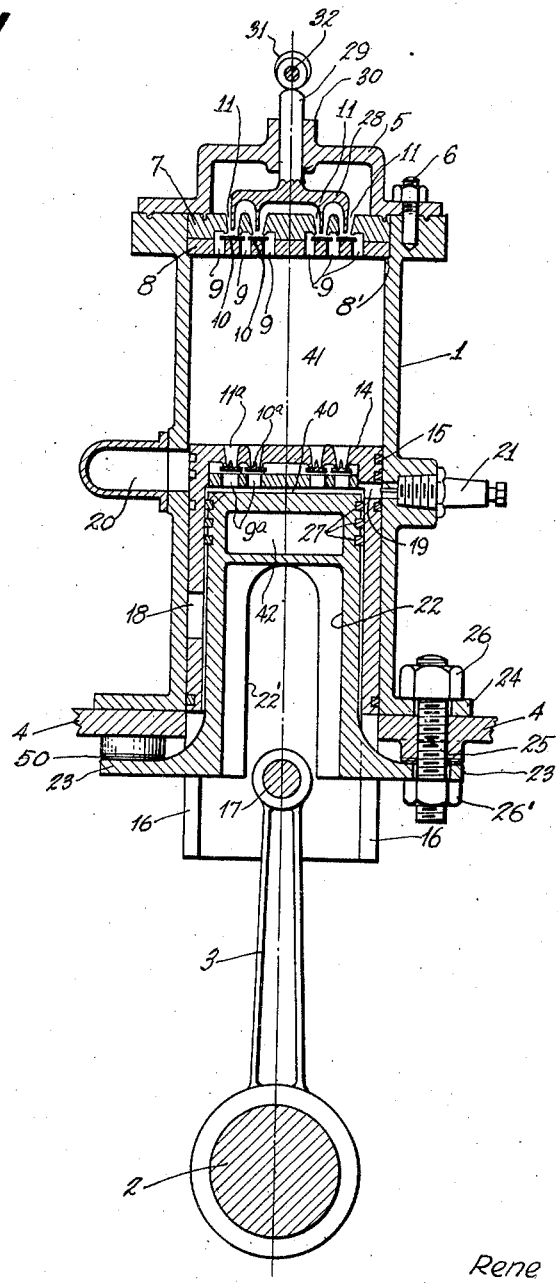

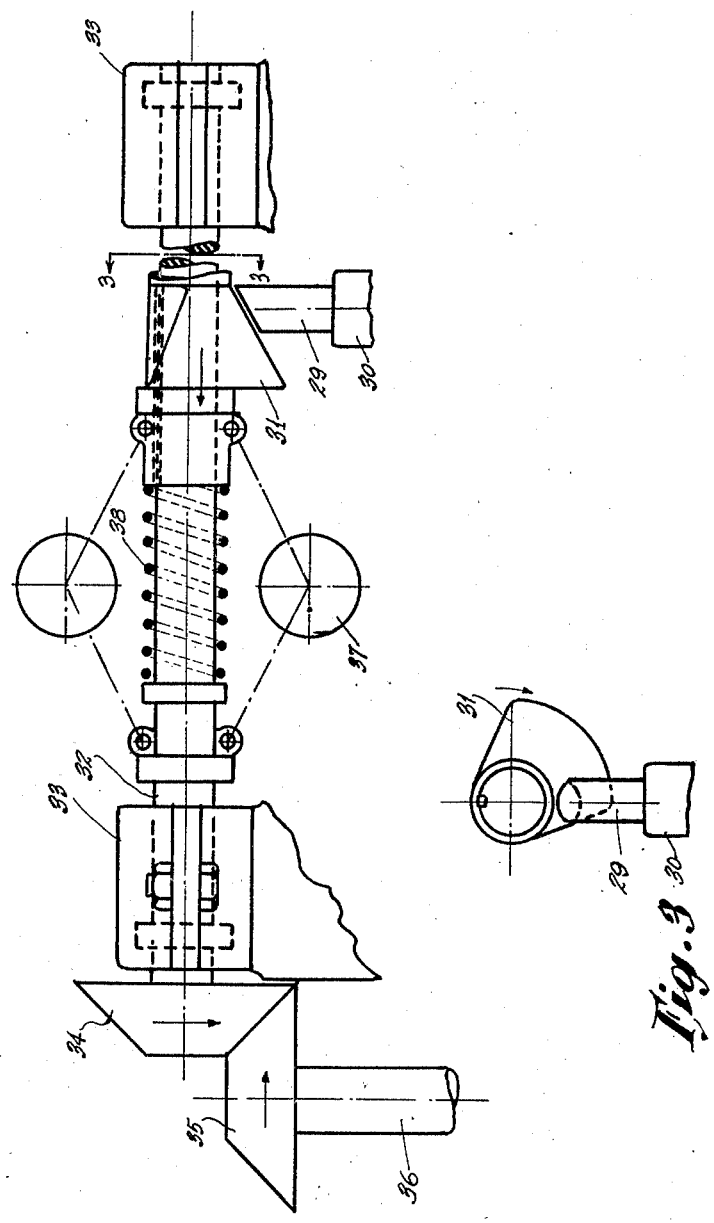

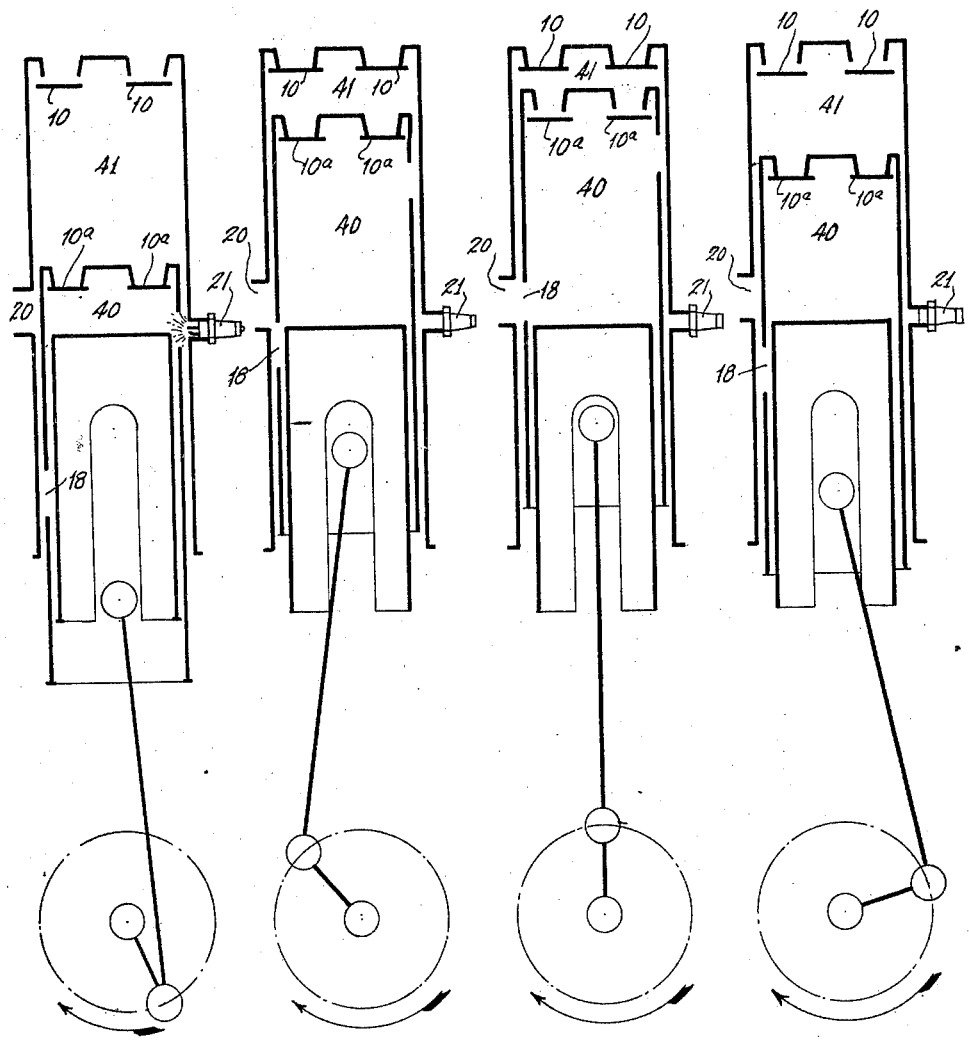

1,732,011

UNITED STATES PATENT OFFICE

RENE GOUIRAND, OF NEW YORK, N. Y.

INTERNAL-COMBUSTION ENGINE

Application filed December 30, 1927. Serial No. 243,497.

This invention is a two cycle internal combustion engine, and the object of the invention is to produce a light, efficient construction capable of developing maximum power at different speeds.

An important feature of the invention consists in providing for efficient induction by the feed of explosive gases into the combustion chamber under relatively high controlled or regulated pressure in order that the engine at high crank shaft speeds may receive an adequate charge of explosive fuel.

Another important feature of the invention consists in the automatic control or regulation of the pressure of inducted gaseous fuel to correspond with crank shaft speed. That is to say, the speed of rotation of the crank shaft automatically controls the compression of the inducted gases which are fed to the combustion chamber of the motor under greater pressures at high speeds than at slower speeds.

Another feature of the invention consists in so constructing the engine that the combustion cylinder is formed within the piston, the piston skirt enveloping a normally stationary part which constitutes the bottom of the combustion chamber, and may be manually regulated to control the minimum combustion space.

It should be noted that in the preferred form of the invention said normally stationary part is mounted to "float" within the piston, while normally secured against movement axially of the piston structure and this floating mounting of the stationary part enables it to automatically center itself at all times within the piston skirt and preclude binding or shifting in such manner as to result in loss of compression or undue friction with the piston skirt.

The engine of this invention, in contradistinction to two cycle engines generally, employs the piston to exert a pull on the connecting rod during the power stroke rather than a push as heretofore. I also wish to call attention to the fact that the motive fuel in gaseous form is compressed prior to introduction into the combustion chamber by movement of the piston and in a space of greater volume than the combustion space, so that an adequate supply of gaseous fuel under relatively high pressure is fed to the combustion space during induction, such fuel as cannot be efficiently fed to the latter space being released so as not to unduly retard the operation of the piston and to control the degree of compression to an extent appropriate to different engine speeds. The induction is also utilized to assist in the scavenging of waste products of combustion.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a transverse section through an engine embodying the present invention, said section being taken through the center of one of the cylinders. In this view the crank case is broken away.

Figure 2 is a diagrammatic view of mechanism associated with the structure of Figure 1 for controlling the induction.

Figure 3 is a section on the line 3—3 of Figure 2.

Figures 4 to 7 are diagrammatic views showing different positions of the piston and the relative positions of the valves during the several operations of the engine.

Referring to the drawing, 1 designates the engine cylinder, 2 the crank shaft and 3 a connecting rod. A suitable crank case of any conventional form is associated with the cylinder and is shown fragmentally at 4. In the drawings, however, it has not been considered necessary to show the entire crank case as this forms no part of the invention and may be conventional.

The cylinder is shown as provided with a removable cover 5 which is made hollow and the interior of which constitutes the intake manifold. This manifold is secured in place by means of stud bolts 6 and said manifold serves to clamp in position a pair of circular plates 7 and 8 which are superimposed on one another, bear upon a seat 8' and are forced to this seat by the manifold 5. A gasket may be employed between the manifold and the top of the cylinder although in practice this is not necessary as the parts may be machined to make a tight fit.

The plate 8 is provided with a series of arcuate slots 9 preferably concentric with one another and with the cylinder, and said plate has a flat or plane upper face adapted to normally support a plurality of ring valves 10, which are adapted to cooperate with arcuate valve openings 11 formed in the plate 7. These valve openings which are also concentric with one another and with the cylinder are radially staggered with respect to the openings 9 of the plate 8 and the under side of the plate 7 is recessed to provide vertical clearance for the ring valves 10 which are so proportioned as to cooperate with the valve openings 11 in order to seal said openings when the rings are lifted from engagement with the plate 8 to bear against the under surface of the plate 7. The margins of the valve openings 11 at the lower face of the plate 7 preferably depend slightly so as to form good tight seats for the ring valves 10 when said valves are raised.

The valve mechanism which I have described is thoroughly efficient for its intended purposes, hereinafter to be more fully explained and is the preferred construction, although if desired, I may employ other forms of valve at the top of the cylinder than that specifically shown. For example, ball valves, lift valves, or rotary valves, such as have heretofore been used in internal combustion engines may be employed in lieu of the structure illustrated.

Mounted to reciprocate within the cylinder 1 is a piston 14. This piston is provided externally with rings 15 and has a relatively deep skirt cut away as shown at 16 to permit of operation of the connecting rod 3 which is secured to the skirt of the piston by the wrist pin 17. The top of the piston embodies valve mechanism which is substantially a duplication of the valve mechanism at the top of the cylinder, the corresponding parts bearing the same reference numerals with "a" associated therewith. The piston skirt is provided with an exhaust port 18 and an ignition opening 19. The exhaust port is adapted to be brought, through reciprocation of the piston, into and out of registration with an exhaust manifold 20, while the ignition port 19 is adapted to be brought by such reciprocation into and out of cooperative relation with the terminals of a spark plug 21.

Extending into the piston from the bottom thereof and well up into the skirt is a floating head 22. This head is hollow and is provided at its bottom with radially extending brackets 23 which are secured to the flange 24 at the lower end of the cylinder and to the crank case 4 by means of double ended studs 25. These studs extend through slightly enlarged holes in the brackets 23, thread through the crank case 4 and pass snugly without threaded engagement through the flange 24 and brackets 23 and receive nuts 26 and 26'. With this arrangement, the head 22 is floatably mounted to partake of automatic slidable radial adjustment within the piston while secured against vertical movement. At the same time, the studs 25 and nuts 26 and 26' bind the parts firmly together against lost motion in a vertical direction and secure the cylinder to the crank case against relative movement in any direction. The head 22 is provided with bearing rings 27 which bear against the inner face of the piston and serve to hold compression. The head is cut away as shown at 22' and the wrist pin operates in these openings.

Cooperating with the ring valves 10 is a fork 28, the tines or fingers of which extend downwardly through the valve openings 11 to engage with the ring valves 10. The shank 29 of the fork extends upwardly through and is guided in a boss 30 of the manifold 5, and the upper end of this shank is adapted for cooperation with a cam 31. The cam 31 is keyed for sliding movement on a shaft 32 which constitutes the valve shaft of the motor. This valve shaft extends along the top of the motor and over as many cylinders as the motor embodies and is mounted for rotation in suitable bearings 33 which serve not only to mount the shaft 32 for rotation, but also to act as thrust bearings against longitudinal movement of the shaft. One end of the shaft is provided with a bevel gear 34 which meshes with the bevel gear 35, the latter gear being secured to a shaft 36 which is driven through any suitable connections from the crank shaft, so that the shaft 32 is driven in timed relation to the crank shaft.

With the cam 31 is associated a ball governor 37 of any suitable type, so arranged that as the shaft 32 increases in speed, the balls of the governor are thrown out and serve to move the cam to the left in Fig. 2. As the speed of the shaft decreases, a spring 38 moves the cam to the right. The cam is shaped as shown in Figs. 2 and 3, so that when the cam is at the extreme left and in the position shown in Fig. 2, rotation of the shaft 32 will not impart any movement to the shank 29. However, as the cam is moved to the right, the eccentricity of the cam will act upon the shank to an increasing extent as the movement of the cam to the right continues. As a result, the cam will rotate idly, when in the position shown in Figure 2, but if the cam is moved to the right, it will act upon the shank to periodically depress the shank and thus depress the fork 28 in order to force or hold the ring valves 10 off of their seats against the under side of the upper plate 7. The purpose of this arrangement is to preclude the valves 10 from fully seating in an upward direction when the engine is traveling at slow speeds, but to permit the seating of said valves when the engine has reached maximum speed.

The operation of the engine which I have thus far described, will now be explained, reference being had particularly to Figures 1 and 4 to 7.

Referring first to Figure 4, it will be noted that the piston is approaching lower dead center on its down or compression stroke. The valves 10$^a$ are closed and the valves 10 are opened. The mixture has been compressed within the combustion chamber 40 and a fresh charge has been drawn in from the intake manifold into the pressure chamber 41. Just before the piston reaches lower dead center and as it reaches about the point shown in Figure 4, the spark plug 21 functions to fire the charge, the timing of the spark is of course controlled in any suitable manner to give the desired advance or retard as the driver may elect. The ignition is shown in Figure 4 as slightly advanced so that proper flame propagation can occur before the piston reaches the lower dead center shown in Fig. 1 and commences its up working stroke. As the piston continues to rise on its working stroke under the expanding action of the burning gases, it reaches a point approximately that shown in Fig. 5 where the exhaust port 18 is just starting to uncover the exhaust manifold 20.

At substantially this point which occurs just prior to upper dead center, the exhaust port is unsealed and it continues to open to allow of the exhaust of the waste products of combustion under pressure of such charge until the valves 10$^a$ open.

It will be noted that during the working stroke of the piston, the upward movement of the piston has compressed the next charge in the compression chamber 41, the valves 10 being held closed during its operation, so that as the piston continues to rise, there comes a point when the pressure in the pressure chamber 41 becomes greater than the pressure in the combustion chamber 40. At this time designated approximately in Fig. 6, the valves 10$^a$ open and highly compressed explosive gases pass by the valves 10$^a$ from the chamber 41 into the combustion chamber 40. A small portion of these gases exits through the exhaust port which is still open and serve to thoroughly scavenge the combustion chamber, so that by the time the piston has passed over upper dead center and has descended sufficiently to close the exhaust port, the compressed gases have passed from the pressure chamber 41 into the combustion chamber 40, have thoroughly scavenged such chamber and have completely filled the chamber, so as to be ready for compression therein. As the piston continues its downward movement on the compression stroke, the pressure within the chamber 41 drops until it becomes a minus pressure, whereupon the valves 10 open and the next charge is drawn into the compression chamber 41, while the previously inducted charge is compressed within the combustion chamber 40.

The piston continues its downward movement until it reaches substantially the position shown in Figure 4, whereupon the cycle of operations which has been described is repeated.

I have assumed in the statement of these operations that the valves 10 remain either fully opened or fully closed. It will be noted, however, that the chamber 41 is of greater volume than the chamber 40 and therefore the capacity of the former is greater than the capacity of the latter. It therefore follows that if the gases which are compressed within the chamber 41 are substantially all fed into the chamber 40 for compression therein, that a very high compression will result in the latter chamber. Such high compression is not necessary at low speeds and may in effect be detrimental under some conditions. It is for this reason that the fork 28 with its associated operating cam is provided. This cam is so set and the centrifugal governor is so regulated that at slow speeds the fork will be acted upon by the cam once during each working stroke of the piston to unseat the valves 10 and allow the release of some of the pressure which is being generated in the chamber 41, so that a very high compression is not set up therein and consequently movement of the piston is not materially retarded by such compression.

As the speed of the engine increases, however, the cam is moved to the left in Figure 2 to render the fork less responsive to the cam, whereby the fork will unseat the valves 10 less and less as the speed increases until at maximum speed the fork will have no influence whatever on the valves 10. Thus at high speeds, the valves 10 will be free to open and close and when closed will fully seal the compression chamber against the escape of compression, so that the full amount of the charge drawn into said compression chamber is forced into the combustion chamber. High compression in the combustion chamber is therefore assured and high speed under efficient operating conditions is obtained.

I wish to call particular attention to the fact that the volume of the compression chamber 41 is greater than that of the combustion chamber 40. This results in numerous advantages, e. g., it will be apparent that during induction the chamber 41 will contain considerably more explosive charge than is required to properly charge the combustion chamber. There is thus an excess, a portion of which may be utilized to insure thorough scavenging of the combustion chamber prior to the closing of the exhaust port. However, after the port has closed, there is ample compressed charge left to fully charge the combustion chamber with undiluted explosive mixture. Moreover, I am able to obtain this highly important result through the employment of a single piston which serves the dual function of the prime mover under the impulse of the burning fuel and also serves a secondary purpose of compressing the explosive charge prior to induction within the compression chamber.

The valvular mechanism between the chambers 40 and 41 is of simple construction and operates automatically under the influence of differential pressures so as to feed the highly compressed gases from the compression chamber 41 into the chamber 40 at a time when the pressure in the former overbalances the pressure in the latter. This scavenging takes place automatically at just the proper time, completely frees the combustion chamber 40 of residual waste products of combustion and leaves said chamber free from such products by the time the exhaust port is closed, whereby a pure undiluted charge is contained within the combustion chamber when the compression stroke commences. Furthermore, the charging of the combustion chamber is complete in contradistinction to the incomplete charge obtained in such chambers when suction is depended upon for producing induction. I am therefore able to obtain much higher compressions than would otherwise be possible.

The utilization of a single piston for the dual purpose to which I have referred has the further advantage of producing a partially balanced operation. In other words, it will be apparent that when the piston is operating on its working stroke, it is also compressing the next charge in the chamber 41. It therefore follows that strains upon the bearings of the connecting rod with the wrist pin and crank shaft are minimized and a smooth flow of power results.

The utilization of the compression chamber wherein the motive fuel is compressed by the piston has pronounced advantage over the prior practice of producing pressure impulses for induction within the crank case. In accordance with this prior practice, it is found that the lubricating oil in the crank case rapidly becomes diluted and requires frequent replenishing. This cannot occur when the present invention is employed.

In the invention as thus far described, I have dealt with the same as utilizing gasoline or other fairly high volatile fuels, the explosive charge being adapted for ignition by a conventional spark plug. I am aware, however, that the construction which I have described may be utilized in carrying out Diesel principles. The conversion into an engine of the Diesel type can be accomplished by merely removing the spark plug from the structure shown in the drawings and providing a suitable oil introducing nozzle in lieu thereof. Instead of feeding carburetted fuel through the intake manifold, air will be fed through the manifold and oil under suitable pressure introduced through the nozzle in proper timed relation to the operations of the piston so that the induction of oil will take place at such time as desired to bring about the explosion of the mixed oil and air under high compression within the combustion chamber.

This invention when utilized in either way hereinbefore referred to is capable of producing unusually high compression for reasons which will be apparent to those skilled in the art. It is therefore well adapted for use in high altitudes. In practice, however, it may be found convenient to introduce between the part 4 and the brackets 23 a plurality of shims 50, which may be manually introduced or removed depending upon the compression desired. For example, in high altitudes less shims will be desirable in order to properly supercharge the motor, while at the lower altitudes more shims should be used. Furthermore, the compression desired for the usual internal combustion engine as distinguished from the Diesel type may be properly adjusted by means of the shims to which I have referred.

The engine which I have described may be air or water cooled or a combination of these methods of cooling. The cylinder 1 may be jacketed for water cooling, if desired, or may be provided with fins for air cooling. In Figure 1, the head 22 is shown as chambered at 42 for water circulation to interiorly cool that portion of the head which is subjected to the direct heat to the explosive charge.

I have arranged for adjustment of volume within the combustion chamber 41 by the mechanism for unseating the inlet valves to a greater or lesser extent as the engine decreases in speed. Adjustment of volume may, however, be accomplished by the employment of clearance pockets which may be opened and closed as may be desired in accordance with the speed of the engine. By the opening of these pockets, the pressure within the chamber 41 may be materially lowered as occasion may require. Provision of clearance pockets is well known in compressors, and I have not considered it necessary to show details of such construction in the drawings. It is sufficient to know that the opening and closing of the pockets is controlled by the speed of the engine.

The engine of this invention is simple in construction, and is thoroughly reliable in its operation. It embodies few operating parts and they are all so constructed as to give thoroughly satisfactory performance and operation. The engine may be made of any number of cylinders and the valves at the cylinder heads may be controlled in the exact manner shown in the drawings or in any other suitable and convenient way without departing from this invention, which is to be understood as fully commensurate with the appended claims.

Having thus fully described the invention, what I claim as new and desire to secure by Letters Patent is:

1. In an internal combustion engine, a suitable cylinder provided with an inlet having a valve associated therewith adapted to be operated by differential pressures and the interior of which cylinder constitutes a compression chamber, a piston operable within said cylinder and provided with a hollow interior constituting a combustion chamber, an inlet valve in the end of the piston and adapted to be operated by differential pressures, and a head stationary with respect to the cylinder and projecting into the piston and forming one end of the combustion chamber, said piston being operable in one direction to open the inlet valve of the cylinder and draw a gaseous charge through said inlet valve of the cylinder into the compression chamber when the pressure in the latter exceeds the pressure in the former, while movement of the piston in the opposite direction will place said charge under compression in the compression chamber and force it through the inlet valve of the piston into the combustion chamber.

2. In an internal combustion engine, a suitable cylinder provided with an inlet valve and the interior of which cylinder constitutes a compression chamber, said valve being constituted to open when the pressure within the compression chamber falls below the pressure on the exterior of the valve, a piston operable within said cylinder and provided with a hollow interior constituting a combustion chamber, an inlet valve in the end of the piston, said valve being constituted to open when the pressure in the combustion chamber falls below the pressure in the compression chamber, and a stationary head projecting into the piston and forming one end of the combustion chamber, whereby movement of the piston in one direction will draw a gaseous charge through the inlet valve of the cylinder into the compression chamber, while movement of the piston in the opposite direction will place said charge under compression in the compression chamber and force it through the inlet valve of the piston into the combustion chamber.

3. In an internal combustion engine, a suitable cylinder provided with an inlet valve and the interior of which cylinder constitutes a compression chamber, said valve being constituted to open when the pressure within the compression chamber falls below the pressure on the exterior of the valve, a piston operable within said cylinder and provided with a hollow interior constituting a combustion chamber, an inlet valve in the end of the piston, said valve being constituted to open when the pressure in the combustion chamber falls below the pressure in the compression chamber, and a stationary head projecting into the piston and forming one end of the combustion chamber, whereby movement of the piston in one direction will draw a gaseous charge through the inlet valve of the cylinder into the compression chamber, while movement of the piston in the opposite direction will place said charge under compression in the compression chamber and force it through the inlet valve of the piston into the combustion chamber, and means automatically controlled by the speed of the engine for effecting a regulated escape of pressure from within the compression chamber for the purpose of controlling the weight of charge fed to the combustion chamber as required for different engine speeds.

4. In an internal combustion engine, a suitable cylinder provided with an inlet valve and the interior of which cylinder constitutes a compression chamber, a piston operable within said cylinder and provided with a hollow interior constituting a combustion chamber, an inlet valve in the end of the piston, and a head projecting into the piston and forming one end of the combustion chamber, whereby movement of the piston in one direction will draw a gaseous charge through the inlet valve of the cylinder into the compression chamber, while movement of the piston in the opposite direction will place said charge under compression in the compression chamber and force it through the inlet valve of the piston into the combustion chamber, the volume of the compression chamber being greater than the volume of the combustion chamber, and means automatically controlled by the speed of the engine for effecting a regulated escape of pressure from within the compression chamber for the purpose of controlling the weight of charge fed to the combustion chamber as required for different engine speeds.

5. In an internal combustion engine, a suitable cylinder provided with an inlet valve and the interior of which cylinder constitutes a compression chamber, a piston operable within said cylinder and provided with a hollow interior constituting a combustion chamber, an inlet valve in the end of the piston, and a head projecting into the piston and forming one end of the combustion chamber, whereby movement of the piston in one direction will draw a gaseous charge through the inlet valve of the cylinder into the compression chamber, while movement of the piston in the opposite direction will place said charge under compression in the compression chamber and force it through the inlet valve of the piston into the combustion chamber, the volume of the compression chamber being greater than the volume of the combustion chamber, and means automatically controlled by the speed of the engine for effecting a regulated escape of pressure from within the compression chamber for the purpose of controlling the weight of charge fed to the combustion chamber as required for different engine speeds, said automatic control means comprising a push member operable to hold the inlet valve of the compression chamber away from its seat during compression of gaseous fuel in said chamber, a cam, operable in timed relation to the piston and having different portions of its length operable to impart a progressively great depression to the push member, and a speed operated governor for automatically presenting different portions of the cam to operate the push member.

In testimony whereof I have signed the foregoing specification.

RENE GOUIRAND.